United States Patent
Kalous et al.

(10) Patent No.: US 7,469,919 B2
(45) Date of Patent: Dec. 30, 2008

(54) COUPLER LOCK

(75) Inventors: Scott Kalous, Libertyville, IL (US);
Mike Sheridan, Lake Villa, IL (US);
Paul R. Peot, Mequon, WI (US)

(73) Assignee: Master Lock Company LLC, Oak Creek, WI (US)

( * ) Notice: Subject to any disclaimer, the term of this patent is extended or adjusted under 35 U.S.C. 154(b) by 353 days.

(21) Appl. No.: 11/375,851

(22) Filed: Mar. 14, 2006

(65) Prior Publication Data

US 2006/0208458 A1    Sep. 21, 2006

Related U.S. Application Data

(60) Provisional application No. 60/594,132, filed on Mar. 14, 2005.

(51) Int. Cl.
*B60D 1/60* (2006.01)
(52) U.S. Cl. .................................. 280/507; 70/258
(58) Field of Classification Search ............... 280/504, 280/507, 511; 70/258
See application file for complete search history.

(56) References Cited

U.S. PATENT DOCUMENTS

| | | | |
|---|---|---|---|
| 3,780,546 A * | 12/1973 | Longenecker .................. | 70/58 |
| 3,977,221 A * | 8/1976 | Foote ........................... | 70/58 |
| 4,032,171 A | 6/1977 | Allen et al. | |
| 5,087,064 A | 2/1992 | Guhlin | |
| 6,393,874 B1 * | 5/2002 | Zapushek et al. .............. | 70/14 |
| 6,412,314 B1 | 7/2002 | Jenks | |
| 6,722,686 B2 * | 4/2004 | Koy ............................ | 280/507 |
| 7,040,646 B2 * | 5/2006 | Pare ............................ | 280/507 |

OTHER PUBLICATIONS

International Search Report and Written Opinion from International Application No. PCT/US06/09344, dated Sep. 21, 2007.
Preliminary Report on Patentability from International Application No. PCT/US2006/009344, dated Oct. 16, 2007.

* cited by examiner

*Primary Examiner*—Paul N Dickson
*Assistant Examiner*—Michael R Stabley
(74) *Attorney, Agent, or Firm*—Calfee, Halter & Griswold LLP

(57) ABSTRACT

An assembly for restricting access to a coupler includes a body, a ball cavity engagement member; and a securing mechanism. The body is configured for engagement with at least one surface of the coupler. The body includes a coupler engagement portion. The ball cavity engagement member is movably coupled to the body and configured for engagement with a ball cavity of the coupler. The securing mechanism can fix the position of the ball cavity engagement member relative to the body such that the assembly is secured to the coupler.

30 Claims, 8 Drawing Sheets

COUPLER LOCK

CROSS-REFERENCE TO RELATED APPLICATIONS

This non-provisional application claims the benefit of U.S. Provisional Patent Application No. 60/594,132, entitled "Trailer Coupler Lock", filed Mar. 14, 2005.

FIELD OF THE INVENTION

This invention relates generally to locking mechanisms and relates specifically to locking mechanisms for trailer couplers.

BACKGROUND OF THE INVENTION

Trailers are typically designed to be attached to a truck or other such vehicles capable of towing a trailer. To allow for this type of operation, trailers are commonly equipped with couplers. A coupler can be designed to attach to ball hitches located on towing vehicles. The ball hitch and coupler can be engaged to allow the vehicle to tow the trailer from one location to another.

Trailers often carry valuable items, such as boats, cars, commercial goods, and the like. Anti-theft mechanisms that are capable of securing a trailer coupler from unauthorized use are desirable. Such anti-theft mechanisms can provide greater security against unauthorized towing of valuable items located on trailers that are idle and unattached to an authorized towing vehicle.

Couplers are manufactured in a wide variety of designs and sizes. Coupler locks are designed and manufactured to accommodate a specific coupler model and a specific coupler size. It is desirable to provide a coupler lock that is capable of securing couplers of different designs and different sizes.

SUMMARY OF THE INVENTION

This invention is directed to apparatus and methods for securing a coupler against unauthorized access or use. The apparatus and methods are designed to allow a coupler lock to secure a variety of couplers of varying designs and sizes.

An embodiment of the invention provides for an assembly that includes a body, a ball cavity engagement member, and a securing mechanism. The body is configured for engagement with at least one surface of the coupler. The body includes a coupler engagement portion. The ball cavity engagement member is movably coupled to the body and configured for engagement with a ball cavity of the coupler. The securing mechanism can fix the position of the ball cavity engagement member relative to the body such that the assembly is secured to the coupler.

DESCRIPTION OF THE DRAWINGS

In the accompanying drawings, which are incorporated in and constitute a part of this specification, embodiments of the invention are illustrated, which, together with a general description of the invention given above, and the detailed description given below serve to illustrate the principles of this invention. The drawings and detailed description are not intended to and do not limit the scope of the invention or the claims in any way. Instead, the drawings and detailed description only describe embodiments of the invention and other embodiments of the invention not described are encompassed by the claims.

DETAILED DESCRIPTION

The Detailed Description of the Invention merely describes preferred embodiments of the invention and is not intended to limit the scope of the claims in any way. Indeed, the invention as described by the claims is broader than and unlimited by the preferred embodiments, and the terms in the claims have their full ordinary meaning.

Figure 1:
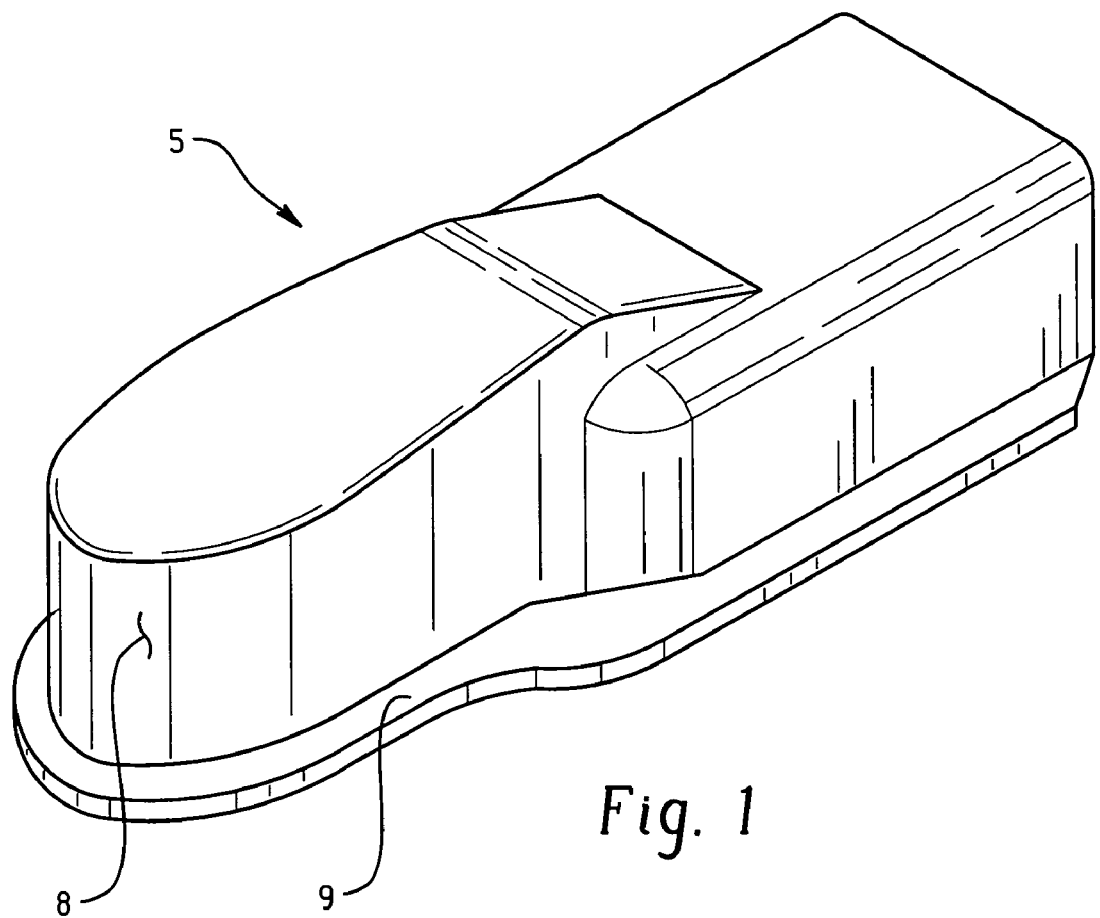
FIG. 1 is a perspective view of a coupler.
Figure 2:
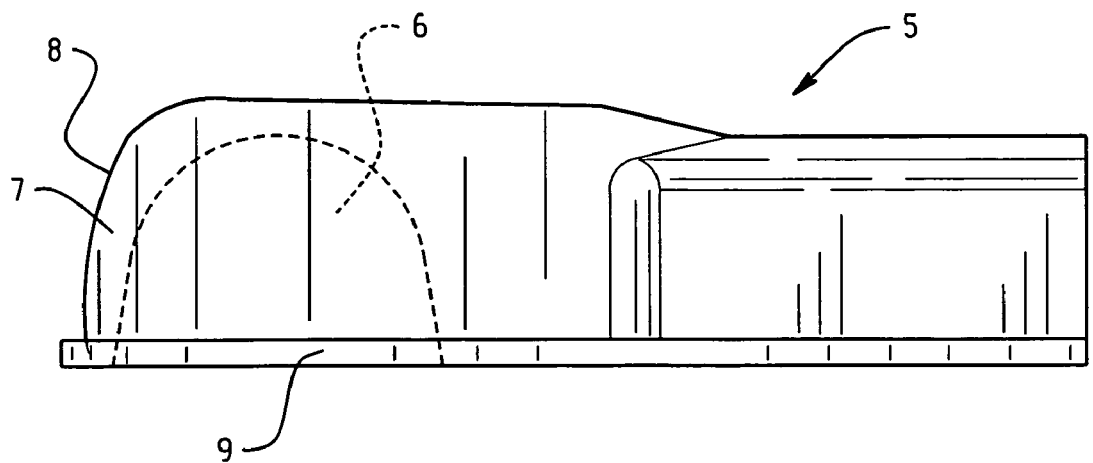
FIG. 2 is a side view of the coupler of FIG. 1.

Coupler locks are used to restrict access to trailer couplers and other such devices designed to engage a ball hitch. As illustrated in FIGS. 1 and 2, a coupler 5 typically includes a ball cavity 6 (seen in phantom line in FIG. 2) that accommodates a ball hitch. The ball cavity 6 is typically positioned near one end of the coupler 5 leaving a shell 7 between the ball cavity 6 and an exterior surface 8 of the coupler 5. Couplers also may include a flange 9, which runs along an outer perimeter of the coupler 5. The coupler 5 illustrated in FIGS. 1 and 2 is exemplary only, as couplers are manufactured in a wide variety of sizes and designs.

Coupler locks include mechanisms to prohibit ball hitches from entering a ball cavity of a coupler when the coupler lock is attached to the coupler. In addition, coupler locks include mechanisms for securing the coupler lock to the coupler to prevent unauthorized persons from removing the coupler lock and accessing the ball cavity. Such mechanisms allow only an authorized person to remove the coupler lock from the coupler. To accommodate couplers of various sizes and designs, the coupler lock of the present invention is designed with components that move relative to other components of the coupler lock. Relative movement of such components allow the coupler lock to be adjusted to accommodate such different sized and designed couplers.

Figure 3:
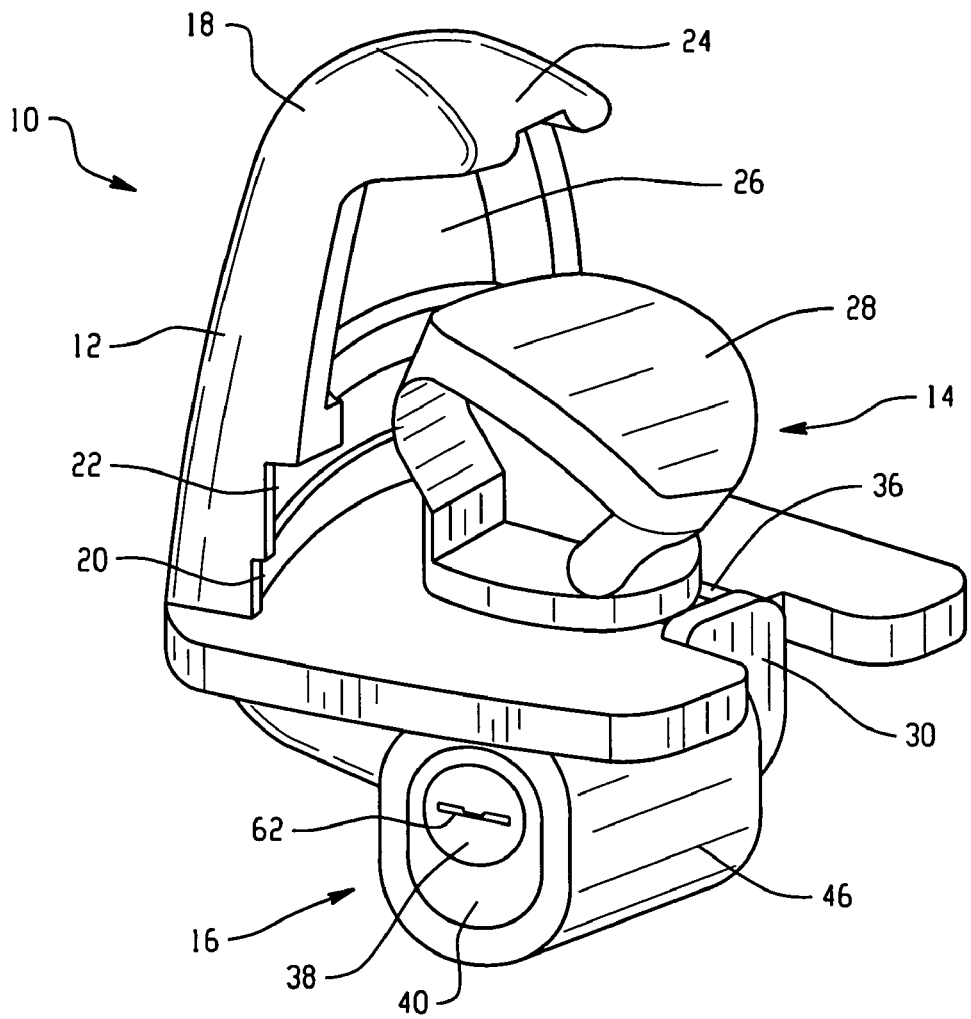
FIG. 3 is perspective view of a coupler lock constructed in accordance with one embodiment of this invention.

Referring to FIG. 3, a perspective view of an exemplary adjustable coupler lock 10 is shown. The coupler lock 10 includes a main body 12, a ball cavity engagement mechanism 14, and a locking or securing mechanism 16. The ball cavity engagement mechanism 14 is movably coupled to the body 12 and can be arranged to allow the coupler lock 10 to engage and secure a variety of couplers, which may range in size and design. The locking mechanism 16 can be selectively arranged to allow the ball cavity engagement mechanism 14 to move relative to the body 12 or can be selectively arranged to fix the location of the ball cavity engagement mechanism 14 relative to the body 12. When the ball cavity engagement mechanism 14 is free to move relative to the body 12, the coupler lock 10 can be adjusted to attach to a coupler. Once the coupler lock 10 is attached to a coupler, the ball cavity engagement mechanism 14 can be fixed relative to the body 12 to secure the coupler lock 10 to the coupler.

The body 12 includes an external coupler engagement portion 18 and first and second grooves 20 and 22. The external coupler engagement portion 18 extends from the body 12 and forms a hook or L-shaped engagement protrusion 24. As will be described, the external coupler engagement portion 18 of the body 12 can be arranged to engage an external or outer surface of a coupler when the coupler lock 10 is attached to or secured to a coupler. The first and second grooves 20 and 22 are located on a wall 26 of the body 12. In the illustrated embodiment, the wall 26 is generally vertical and located along an inner surface of the body 12. As shown in FIGS. 1 and 2, couplers 5 are often designed with flanges 9 along an outer perimeter. The first and second grooves 20 and 22 are arranged to accommodate a variety of flanges of different couplers when the coupler lock 10 is attached to or secured to a coupler.

Figure 4A:
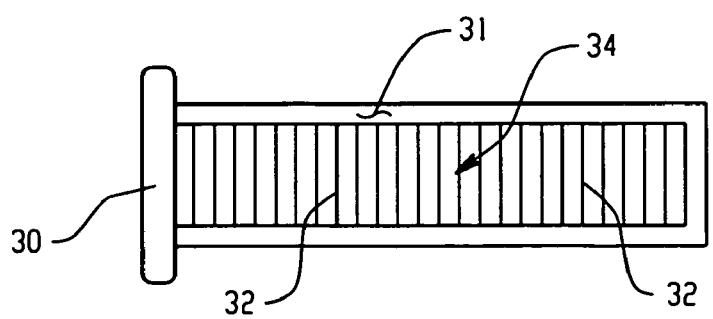
FIG. 4A is a bottom view of the slide of the coupler lock of FIG. 3.
Figure 4:
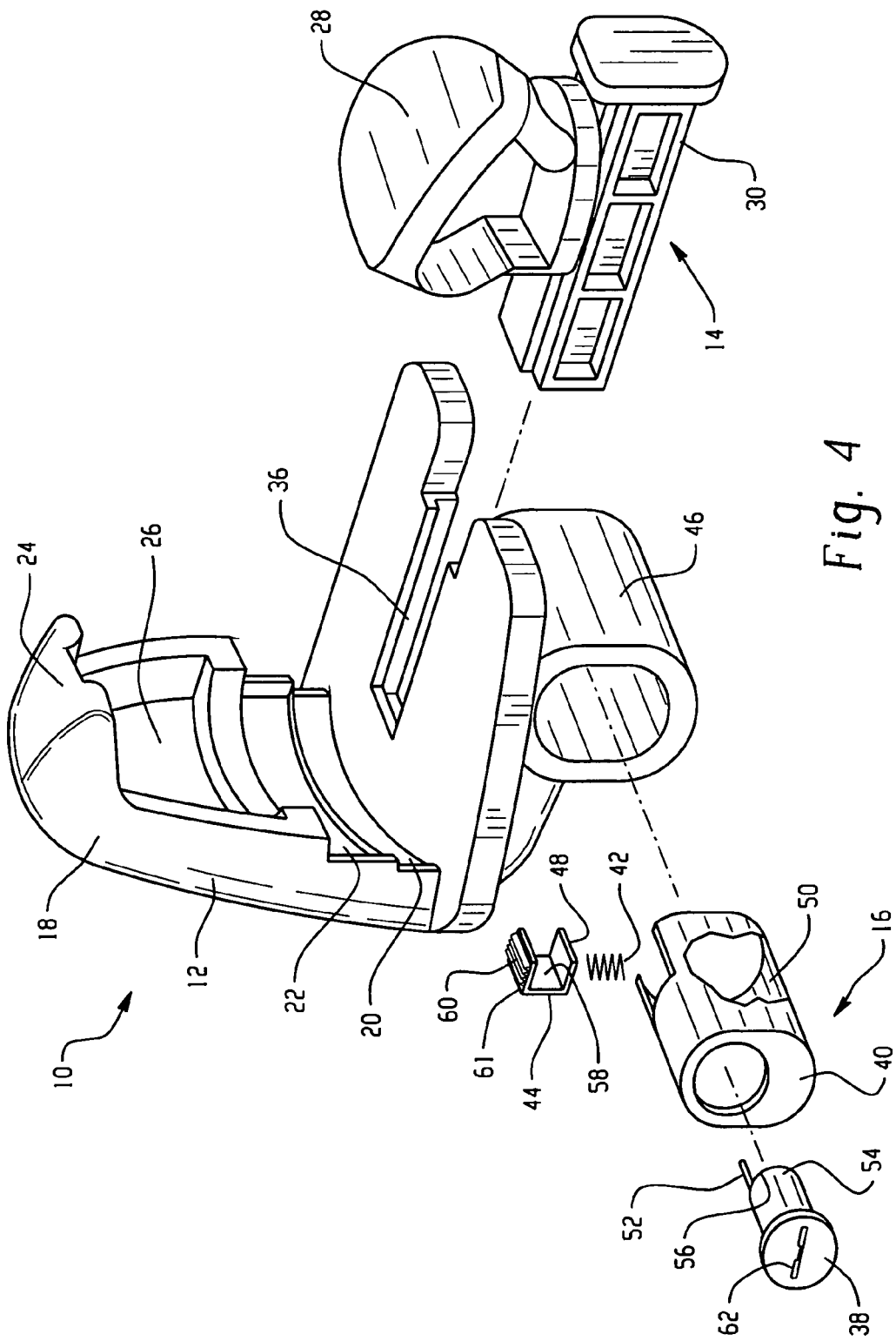
FIG. 4 is an exploded view of the coupler lock of FIG. 3.

Referring to FIG. 4, the ball cavity engagement mechanism 14 includes a ball-like protrusion 28 rigidly attached to a square slide 30. As seen in FIG. 4A, a bottom surface 31 of the square slide 30 includes a series of teeth 32 arranged perpendicularly to the length of the slide 30. These teeth 32 form a rack 34 that can be engaged to limit the movement of the slide 30. The body 12 includes a slot 36 arranged to accommodate the slide 30. The slide 30 fits into the slot 36 and allows the ball cavity engagement mechanism 14 to move relative to the body 12. The ball cavity engagement mechanism 14 is arranged such that when the ball cavity engagement mechanism 14 is moved, the distance between the ball-like protrusion 28 and the wall 26 of the body 12 changes.

With reference to FIGS. 3 and 4, as the ball cavity engagement mechanism 14 moves to the right, the distance between the ball-like protrusion 28 and the wall 26 of the body 12 increases. As the ball cavity engagement mechanism 14 moves to the left, the distance between the ball-like protrusion 28 and the wall 26 of the body 12 decreases. Optionally, the slide 30 can include a stop member (not shown) to prevent the slide 30 from fully exiting the slot 36 as the slide 30 is moved to the right. The slide 30, as shown, has a square cross-section; however, the cross-section of a slide and the configuration of a slide, slot, and ball-like protrusion is not limited to that shown. Any cross-section and configuration that allows a ball-like protrusion or other engagement member to move in at least two directions relative to a body is included in this disclosure.

Generally, the coupler lock 10 is attached to a coupler by clamping a portion of the coupler between the ball-like protrusion 28 and a portion of the body 12. The portion of the coupler that is clamped in generally the shell 7 of the coupler 5, as shown in FIG. 2. As will be subsequently discussed in detail, to attach and secure a coupler lock 10 to a coupler the ball-like protrusion 28 is placed within a ball cavity of a coupler. The ball cavity engagement mechanism 14 is then moved towards the body 12 to decrease the distance between the ball-like protrusion 28 and the wall 26 of the body 12. The ball cavity engagement mechanism 14 is moved in this direction until a portion of the coupler is clamped between the ball-like protrusion 28 and the body 12. The coupler lock 10 is then secured to the coupler by arranging the locking mechanism 16 to fix the location of the ball cavity engagement mechanism 14 relative to the body 12. Once the coupler lock 10 is in this locked or secured configuration, the locking mechanism 16 must be unlocked to allow the ball cavity engagement mechanism 14 to be moved away from the wall 26 of the body 12 so that the coupler lock 10 can be removed from the coupler.

As best seen in FIG. 4, the locking mechanism 16 includes a lock cylinder 38, a sleeve 40, a spring 42, and a C-shaped engagement member 44. The locking mechanism 16 shown is for exemplary purposes only and other locking mechanism designs can be utilized in the practice of this invention. The locking mechanism 16 is assembled and located in a cylindrical housing 46, which is attached to the bottom of the body 12. The housing 46 is located below the slot 36 in the body 12. An opening (not shown) on the topside of the housing 46 provides the locking mechanism 16 with access to the slide 30 as the ball cavity engagement mechanism 14 moves along the slot 36. This access allows the locking mechanism 16 to interact with the rack feature 34 of the slide 30 to either fix the position of the ball cavity engagement mechanism 14 with respect to the body 12, which places the coupler lock 10 into a locked state; or allow the ball cavity engagement mechanism 14 to move freely with respect to the body 12, which places the coupler lock 10 into an unlocked state. Optionally, the locking mechanism 16 can be arranged to limit the movement of the ball cavity engagement mechanism 14 to one direction with respect to the body 12, which places the coupler lock 10 into an adjustment state. The adjustment state, as will be further described, can assists the user in attaching and securing the coupler lock 10 to a coupler When the locking mechanism 14 is assembled, the lock cylinder 38, C-shaped engagement member 44, and spring 42 are at least partially located within the sleeve 40. The spring 42 is located between a bottom surface 48 of the C-shaped engagement member 44 and an internal surface 50 of the sleeve 40. The spring 42 is configured to bias the C-shaped engagement member 44 upwards (with respect to FIG. 4) toward the slide 30 of the ball cavity engagement mechanism 14. The lock cylinder 38 includes a tab 52 extending from a first end 54 of the lock cylinder 38. The tab 52 is offset from the longitudinal center of the lock cylinder 38 and preferable located near the outer edge 56 of the lock cylinder 38 (as seen in FIG. 4). When the locking mechanism 16 is assembled, the tab 52 of the lock cylinder 38 is located within the C-shaped engagement member 44 and comes into contact with an internal surface 58 of the C-shaped engagement member 44. The interaction of the tab 52 and the internal surface 58 of the C-shaped engagement member 44 determines whether the coupler lock 10 is in a locked state, an unlocked state, or an adjustment state.

The C-shaped engagement member 44 includes a series of ridges 60 that are designed to interact with the rack 34 on the underside of the square slide 30. The ridges 60 are located on a top surface 61 of the C-shaped engagement member 44 and can access the rack 34 through the opening in the housing 46. The lock cylinder 38 includes a key slot 62 to accommodate a key. When a proper key is inserted into the key slot 62, the lock cylinder 38 can be turned or rotated, thus changing the orientation of the lock cylinder 38. As the orientation of the lock cylinder 38 changes, the position of the tab 52 relative to the C-shaped engagement member 44 changes. As the position of the tab 52 changes, the C-shaped engagement member 44 changes position relative to the square slide 30, which changes the nature of the interaction between the ridges 60 and the rack 34.

When the lock cylinder 38 is oriented such that the tab 52 is at the highest point, or the 12 o'clock position (as seen in FIG. 4) the tab 52 forces the C-shaped engagement member 44 to its highest point and places the coupler lock 10 in the locked state. In this locked state the ridge features 60 of the C-shaped engagement member 44 are fully engaged with the teeth features 32 on the rack 34 on the underside of the square slide 30. The C-shaped engagement feature 44 is rigidly held in this position by the tab 52. In this configuration, the ridges 60 on the C-shaped engagement member 44 and the teeth 32 on the rack 34 interact to lock the slide 30. This arrangement stops any substantial movement of the ball cavity engagement mechanism 14 relative to the body 12.

When the lock cylinder 38 is rotated 180 degrees from the locked state, to the 6o'clock position (with respect to FIG. 4), the tab 52 forces the C-shaped engagement mechanism 44 to its lowest point and the coupler lock 10 is placed in the unlocked state. In this unlocked state, the ridges 60 are no longer engaged with the teeth 32 of the rack 34 and the ball cavity engagement mechanism 14 is free to slide in either direction within the slot 36.

To place the coupler lock 10 into an adjustment state, the lock cylinder 38 is rotated 90 degrees counter-clockwise of the locked position or 90 degrees clockwise of the unlocked position, to the 9 o'clock position (with respect to FIG. 4). In this adjustment state, the position of the C-shaped engagement member 44 is controlled by the spring 42 positioned beneath the C-shaped engagement member 44. The spring 42 biases the C-shaped engagement member 44 such that the ridge features 60 are engaged with the teeth 32 of the rack 34. However, the position of the C-shaped engagement member 44 is not rigidly set. The spring 42 allows the C-shaped engagement member 44 to move downward when movement of the rack 34 causes the teeth 32 to apply a downward force on the C-shaped engagement member 44 that is larger than the upward force the spring 42 applies to the C-shaped engagement member 44. In this arrangement, the ridge features 60 and the teeth 32 exhibit ratcheting behavior, with the ridge features 60 serving as a pawl for the teeth 32. This ratcheting behavior allows the slide 30, and thus the ball-like protrusion 28, to move incrementally towards the wall 26 of the body 12, but prohibits the slide 30 from moving in the opposite direction away from the wall 26 of the body 12.

One method for attaching and securing the coupler lock 10 to a coupler is as follows. The lock cylinder 38 of the coupler lock 10 is placed in the unlocked state by using a proper key. The ball-like protrusion 28 is moved away from the wall 26 of the body 12. The ball-like protrusion 28 is placed within the ball cavity of the coupler. The ball-like protrusion 28 is moved towards the wall 26 of the body 12 until a portion of the coupler is positioned and clamped between the ball-like protrusion 28 and a portion of the body 12. The lock cylinder 38 is placed in the locked state using the proper key to fix the position of the ball-like protrusion 28 relative to the body 12. This method captures a portion of the coupler between the ball-like protrusion 28 and a portion of the body 12 such that the ball cavity is inaccessible to a ball hitch and the coupler lock 10 cannot be removed from the coupler without first placing the lock cylinder 38 in an unlocked state using the proper key.

Optionally, the lock cylinder 38 can be placed in the adjustable state after the ball-like protrusion 28 is placed within the ball cavity. In this arrangement, the ball-like protrusion 28 is allowed to move incrementally and only in one direction, i.e., towards the wall 26 of the body 12. Under these conditions, a user does not have to maintain pressure on the coupler lock 10 while turning the lock cylinder 38 to the locked state. The user can apply pressure to clamp a portion of the coupler between the ball-like protrusion 28 and a portion of the body 12 and that pressure is maintained by the ratcheting system provided by the ridges 60 of the C-shaped engagement member 44 and the teeth 32 of the rack 34 when the user releases pressure to place the coupler lock 10 in the locked position.

Figure 5:
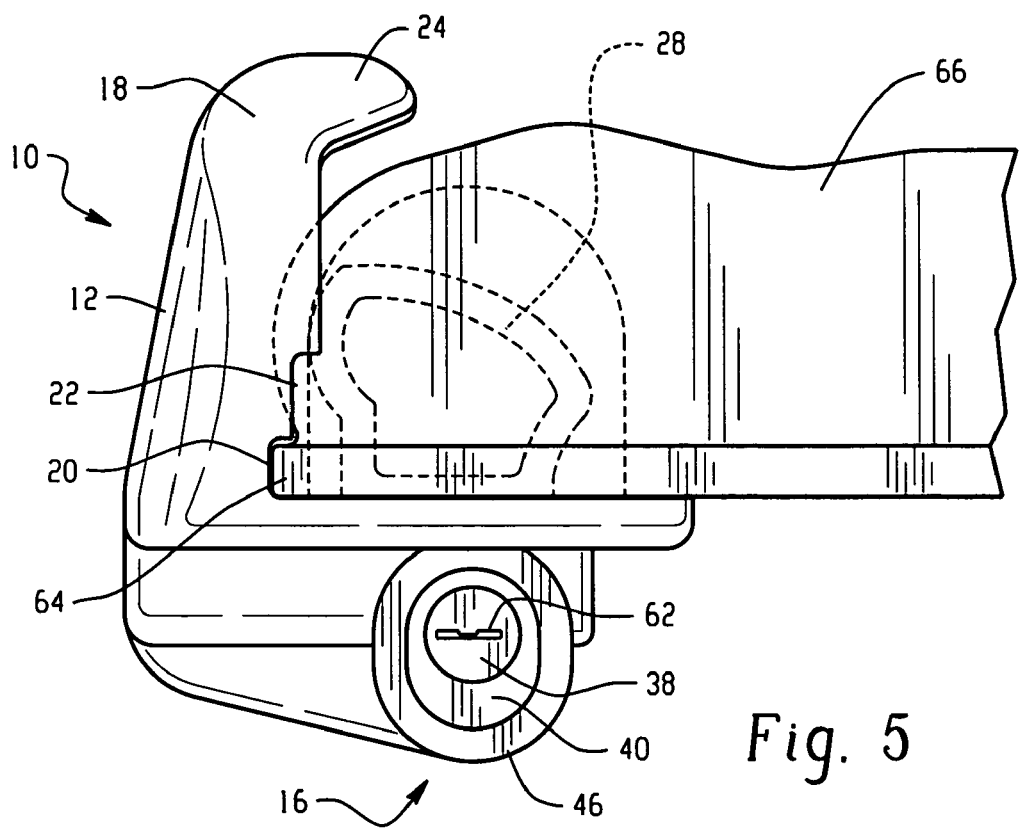
FIG. 5 is side view of the coupler lock of FIG. 3 secured to a coupler with a flange.

A flange of a coupler can also be utilized to securely attach a coupler lock 10 to a coupler. Referring to FIG. 5, a flange 64 of a coupler 66 is located within the first groove 20 of the body 12. When the coupler lock 10 is secured to the coupler 66, having the flange 64 positioned within a groove 20 will further resist any attempt to remove the coupler lock 10 from the coupler 66 through unauthorized means. FIG. 5 illustrates the first groove 20 in use; however, the second groove 22 can also be used in a similar manner for flanges that cannot fit into the first groove 20. Although two grooves 20 and 22 are shown, any number of grooves can be included in a body to accommodate a variety of flange sizes and designs. Optionally, the coupler engagement portion 18 of the body 12 can be placed in contact with the coupler 66.

Figure 6:
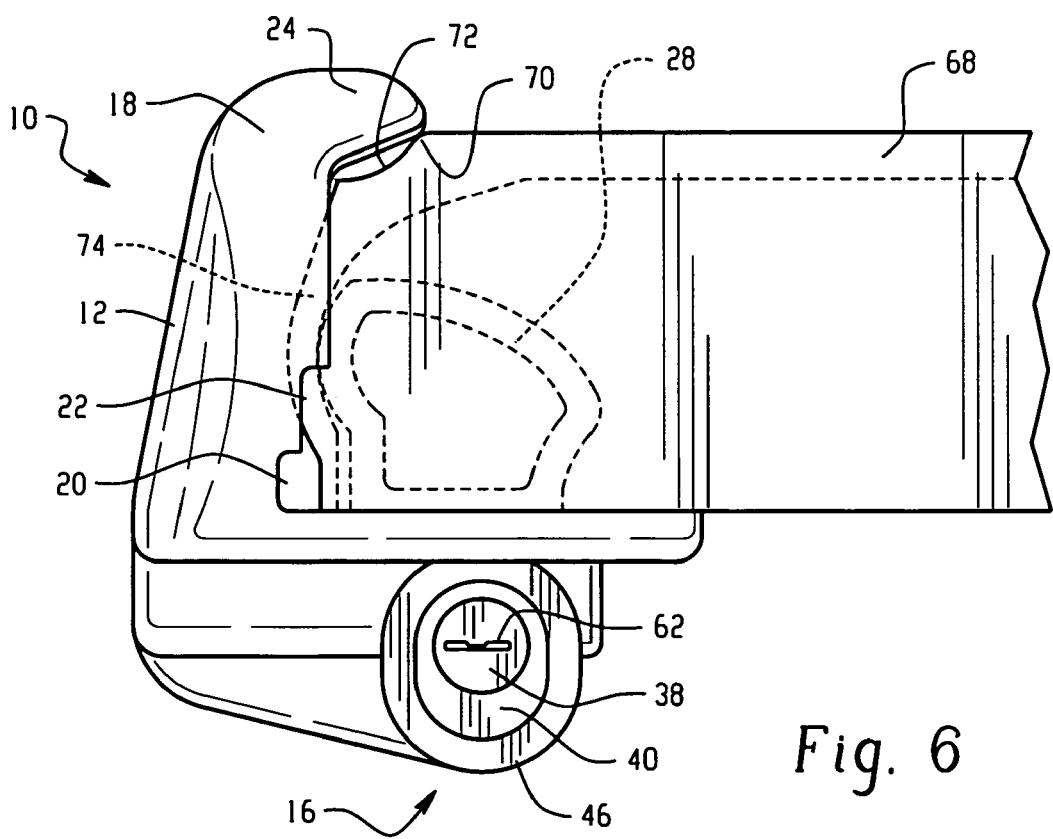
FIG. 6 is a side view of the coupler lock of FIG. 3 secured to a coupler without a flange.

Not all couplers are designed with flanges. Referring to FIG. 6, a coupler lock 10 is shown secured to a flangeless coupler 68. The coupler engagement portion 18 of the body 12 is shown in contact with an external surface 70 of the coupler 68. The coupler engagement portion 18 can be used to further secure the coupler lock 10 to the flangeless coupler 68. The coupler engagement portion 18 may be configured to engage a top portion 72 of the coupler 68 to resist upward movement of the coupler 68. In addition, the coupler lock 10 can be arranged such that a portion 74 of the coupler 68 is clamped between the ball-like protrusion 28 and the coupler engagement portion 18 of the body 12.

Referring to FIGS. 7 through 11, another embodiment of an adjustable coupler lock 100 is illustrated. The ball cavity engagement mechanism 14, the movement of the ball cavity engagement mechanism 14 relative to the body 102, the locking mechanism 16, and the first and second grooves 20 and 22 are generally the same as described in FIGS. 3 through 6. The shape of the ball-like protrusion 103 is generally more spherical than the ball-like protrusion 28 shown in FIGS. 3 through 6.

Figure 8:
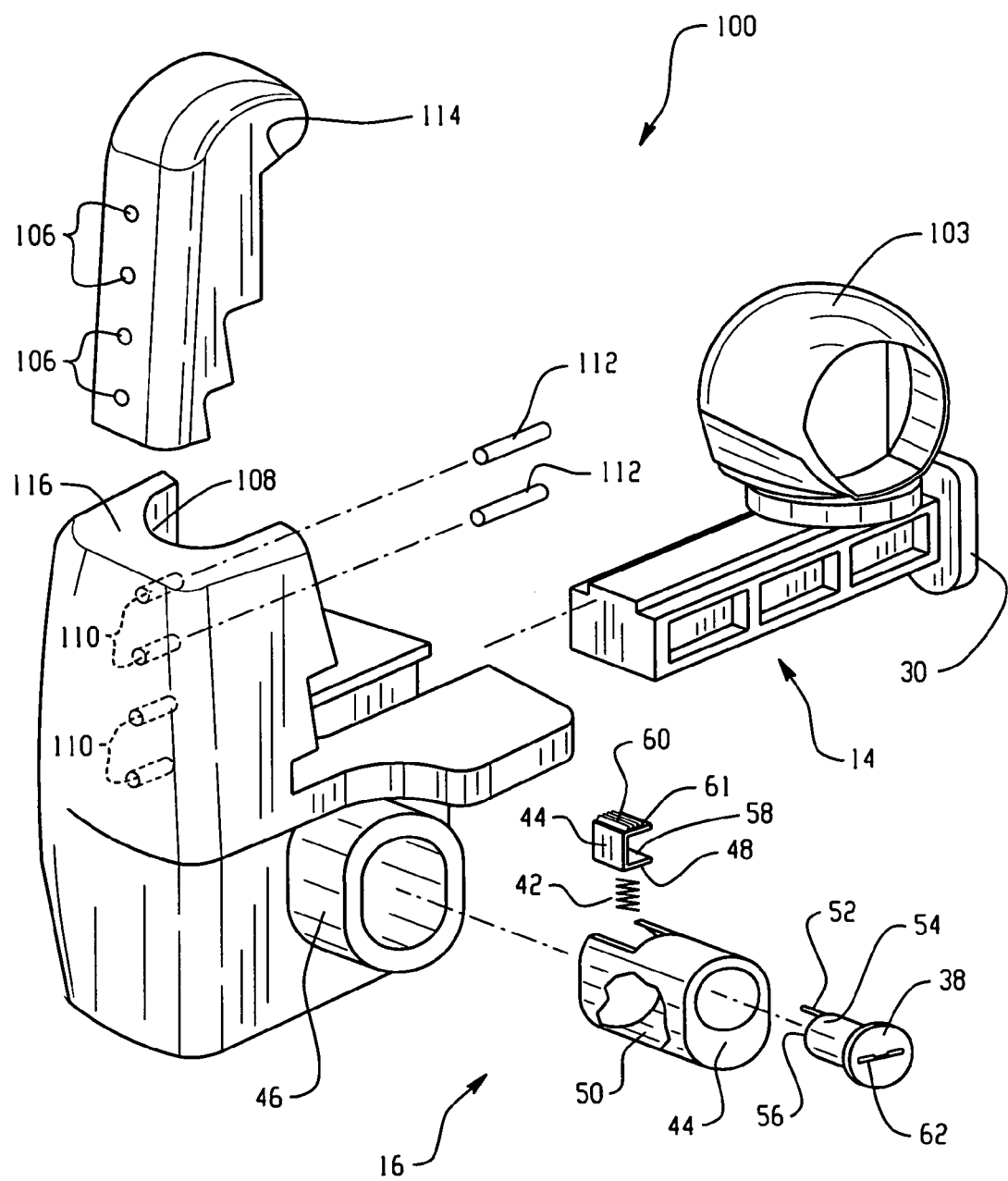
FIG. 8 is an exploded view of the coupler lock of FIG. 7.

In this embodiment, the coupler engagement portion is no longer an integral portion of the body 102. The general function performed by the coupler engagement portion, to engage an outer surface of the coupler, is performed by a separate component 104 whose position can be adjusted relative to the body 102. As best shown in FIG. 8, an L-shaped protrusion member 104 can be adjustably coupled to the body 102. The L-shaped protrusion member 104 can be coupled and secured to the body 102 in a number of positions. The L-shaped protrusion member 104 includes a series of apertures 106. The wall 108 of the body 102 includes a series of tapped holes 110. Screws 112 or other such fasteners can be inserted through the apertures 106 in the L-shaped protrusion member 104 and secured into the tapped holes 110 in the body 102. This mechanism can be used to determine and adjust the position of the L-shaped protrusion member 104 relative to the body 102. This positioning determines how much a coupler engagement portion 114 of the L-shaped protrusion member 104 extends above the top 116 of the body 102.

The position of the L-shaped protrusion member 104 relative to the body 102 can be adjusted to accommodate different designs and sizes of couplers. The L-shaped protrusion member 104 can be positioned higher, relative to the body 102, for couplers with higher profiles. Conversely, the L-shaped protrusion member 104 can be positioned lower, relative to the body 102, for couplers with lower profiles.

Figure 9:
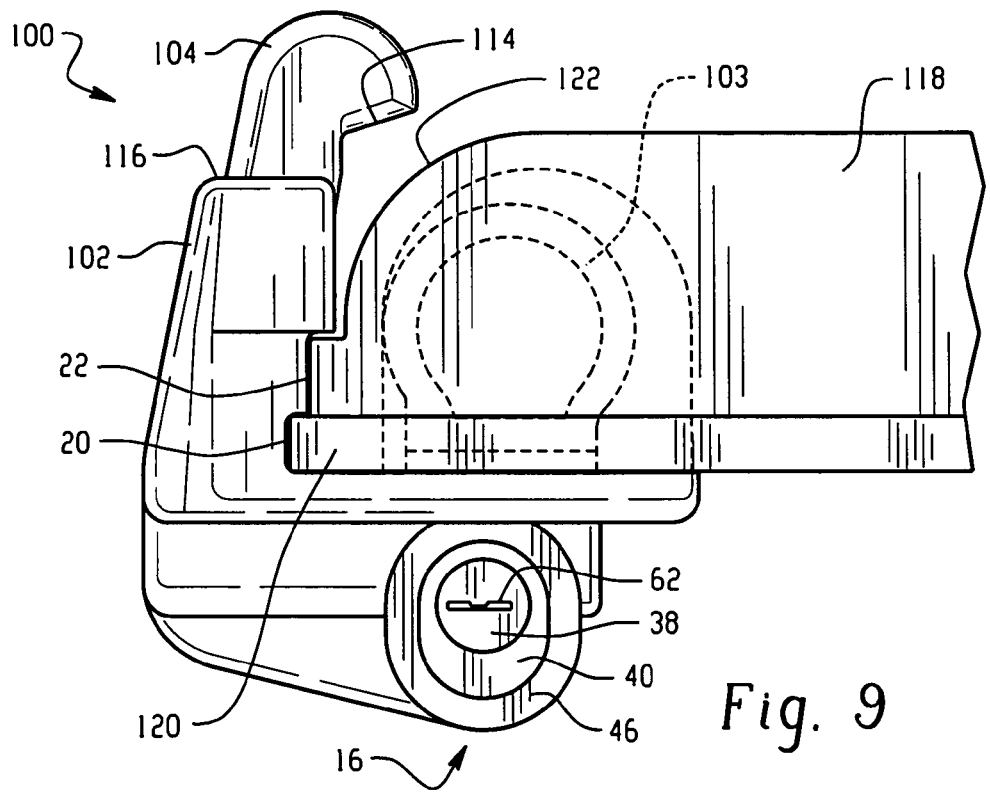
FIG. 9 is a side view of the coupler lock of FIG. 7 secured to a coupler with a flange.

As shown in FIG. 9, a coupler lock 100 is shown secured to a coupler 118 with a flange 120. Similarly to FIG. 5, the flange 120 is positioned in the first groove 20 to further resist any attempt to remove the coupler lock 100 from the coupler 118 through unauthorized means. The L-shaped protrusion member 104 may be optionally positioned such that the coupler engagement portion 114 engages an external surface 122 of the coupler 118. This engagement can offer additional resistance to removal of the coupler lock 100 from the coupler 118 through unauthorized means.

Figure 10:
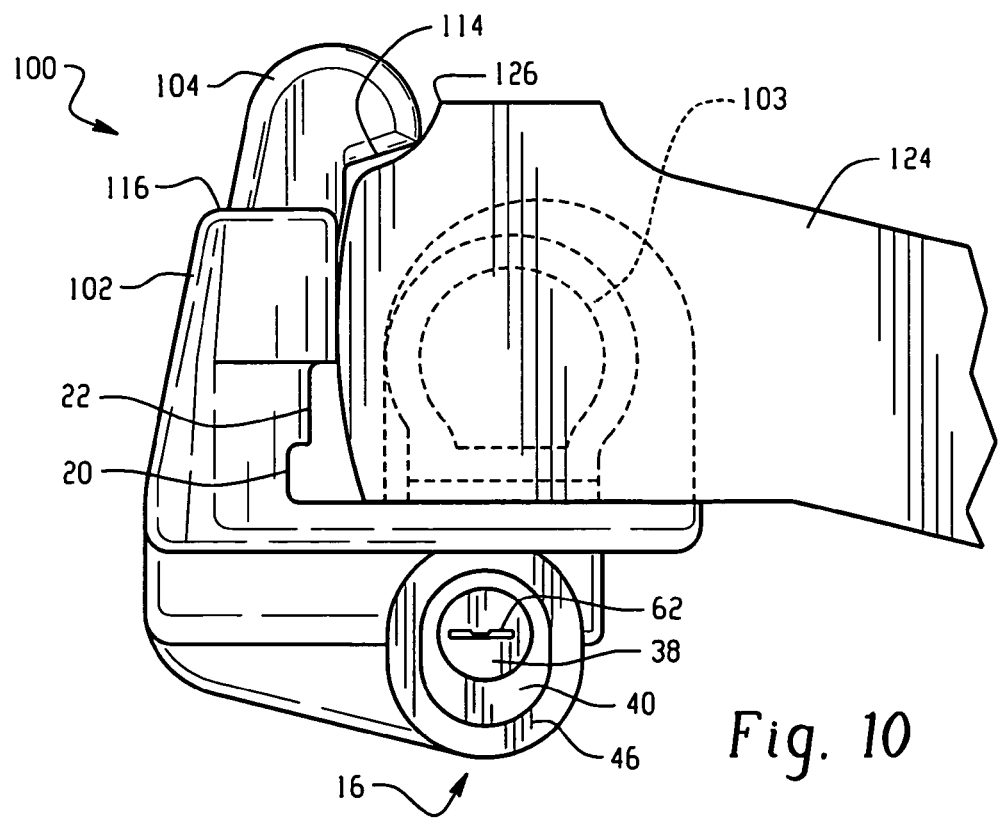
FIG. 10 is a side view of a coupler lock of FIG. 7 secured to a coupler without a flange.
Figure 11:
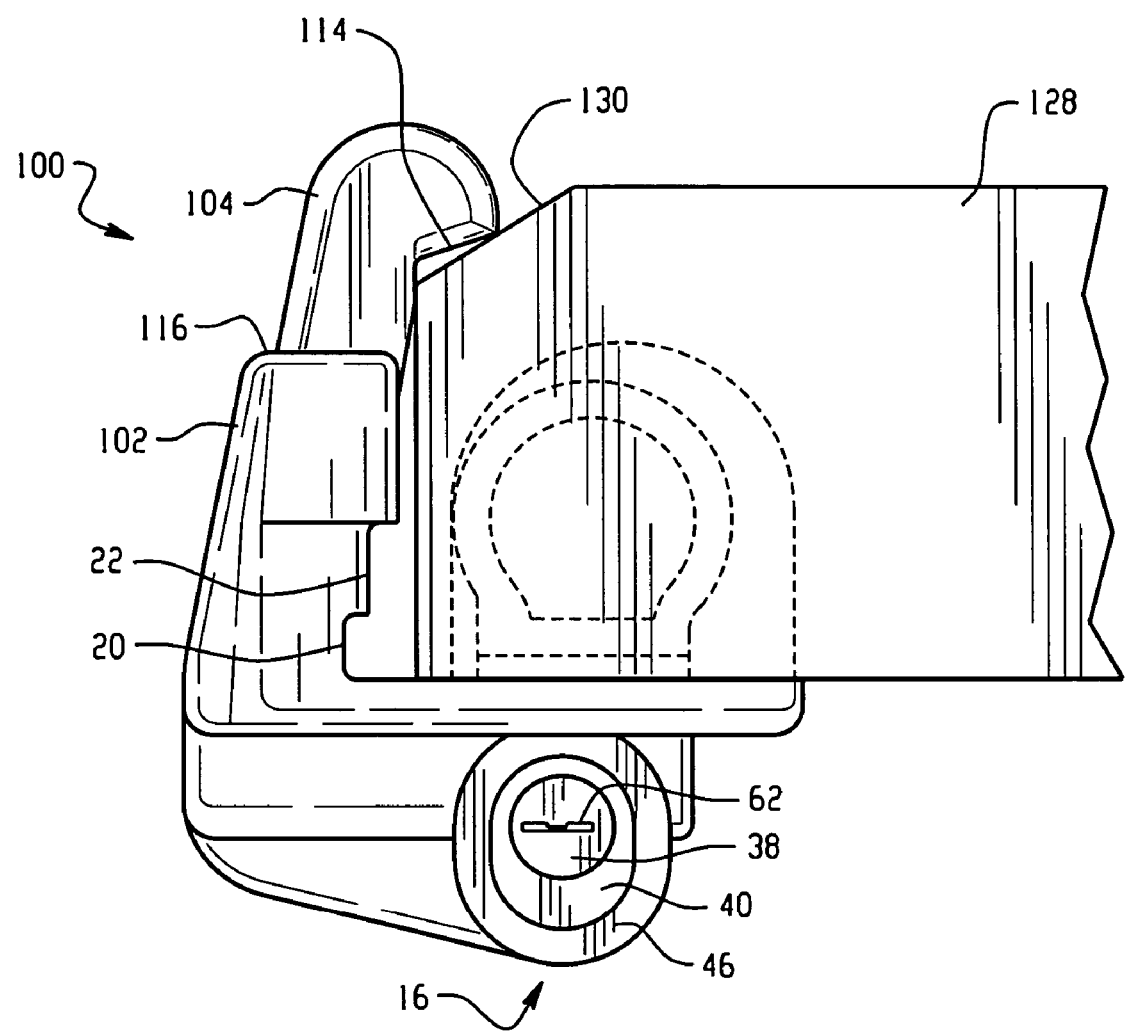
FIG. 11 is a side view of a coupler lock of FIG. 7 secured to another coupler without a flange.

The flexibility in positioning the L-shaped protrusion member 104 is shown in FIGS. 10 and 11. In FIG. 10, the coupler lock 100 is secured to a coupler 124 with a relatively low profile and an indent in the outer surface 126. This allows the coupler engagement portion 114 of the L-shaped protrusion member 104 to engage an outer surface 126 of the coupler 124 while a relatively small portion of the L-shaped protrusion member 104 extends above the top 116 of the body 102. In FIG. 11, the coupler lock 100 is secured to a coupler 128 with a relatively high profile. Under these circumstances, the coupler engagement portion 114 of the L-shaped protrusion member 104 can engage an outer surface 130 of the coupler 128 when the L-shaped protrusion member 104 is positioned such that a relatively large portion of the L-shaped protrusion member 104 extends above the top 116 of the body 102. In both FIGS. 10 and 11, the L-shaped protrusion member 104 is secured to the body 102 by at lest one fastener 112 passing through at least one aperture 106 in the L-shaped protrusion member 104 and being secured in at least one tapped hole 110 in the wall 108 of the body 102.

Figure 7:
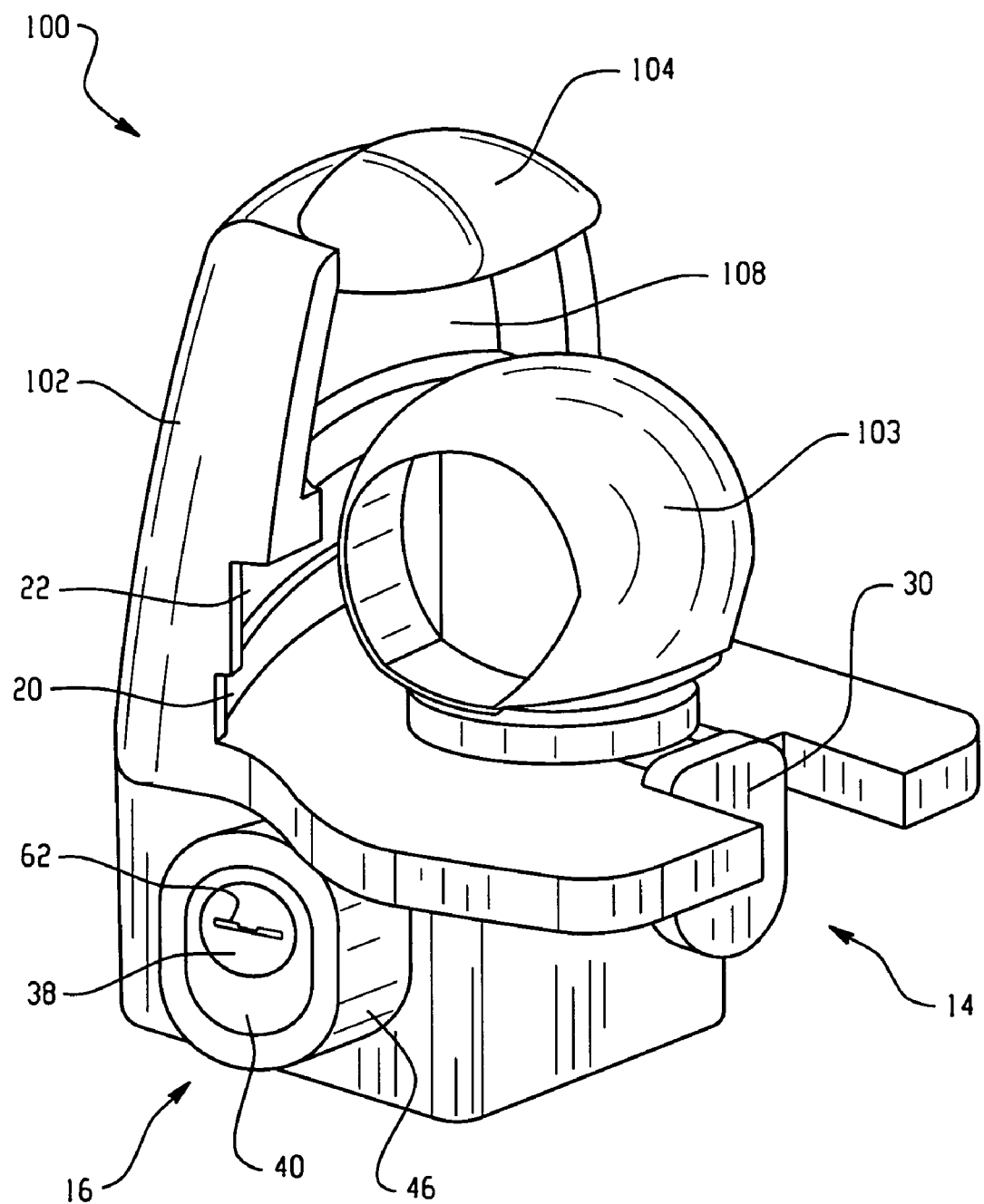
FIG. 7 is a perspective view of a coupler lock constructed in accordance with another embodiment of this invention.

In the coupler lock 100 as shown in FIGS. 7 though 11, the L-shaped protrusion member 104 must be positioned and attached to the body 102 with fasteners 112 before the coupler lock 100 is attached to a coupler. However, this disclosure is not limited to the arrangement shown. Configurations in which the position of an L-shaped protrusion member relative to a body can be adjusted after the coupler lock engages with a coupler are included in this disclosure. One such configuration is similar to that which allows for the ball cavity engagement mechanism 14 to be positioned relative to the body 12 and 102. A locking mechanism can be utilized to engage with an L-shaped protrusion member such that the position of the L-shaped protrusion member is adjustable until the locking mechanism is placed in a locked state. This locking mechanism can include an unlocked state and an adjustment state similar to that described herein.

The disclosure shows two different exemplary shapes for the ball-like protrusion 28 and 103. In FIGS. 7 through 11, the ball-like protrusion is generally spherical and in FIGS. 3 through 6, the ball-like protrusion includes generally flat surfaces. This disclosure is not limited to the protrusions shown or protrusions that are generally ball-like. Any protrusion that allows at least a portion of a coupler to be clamped between the protrusion and a portion of the body or other protrusion members is included in this disclosure.

While various aspects of the invention are described and illustrated herein as embodied in combination in the exemplary embodiments, these various aspects may be realized in many alternative embodiments not shown, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however; such values and ranges are not to be construed in a limiting sense and are intended to be critical values or ranges only if so expressly stated.

We claim:

1. An assembly for restricting access to a coupler, the assembly comprising:
   a. a body configured for engagement with at least one surface of a coupler, the body including a coupler engagement portion and a laterally extending slot;
   b. a coupler engagement member moveably coupled to the body and laterally movable within the slot, the coupler engagement member extending perpendicularly from the slot for engagement with a ball cavity of the coupler; and
   c. a securing mechanism for laterally securing the coupler engagement member relative to the body in a coupler retaining position;
   wherein when the coupler engagement member is inserted in the ball cavity of the coupler and the coupler engagement member is secured in the coupler retaining position, the coupler engagement portion of the body prevents withdrawal of the coupler engagement member from the ball cavity.

2. The assembly of claim 1 wherein the coupler engagement portion of the body is configured to engage an exterior surface of coupler when the assembly is secured to the coupler.

3. The assembly of claim 1 wherein the body includes a coupler flange retention groove configured for selective engagement with a flange of the coupler.

4. The assembly of claim 1 wherein the securing mechanism is coupled to the body and includes a locking member engageable with the coupler engagement member; wherein the locking member is operable between a first state and a second state.

5. The assembly of claim 4 wherein when the locking member is in the first state, the position of the coupler engagement member is fixed with respect to the body and when the locking member is in the second state, the coupler engagement member is moveable in at least two directions with respect to the body.

6. The assembly of claim 4 wherein the locking member is further operable to a third state; wherein when the locking member is in the third state, the coupler engagement member is limited to movement in one direction with respect to the body.

7. The assembly of claim 4 wherein the locking member comprises a lock cylinder.

8. A method of restricting access to a coupler comprising:
   positioning at least a portion of a coupler engagement member within a ball cavity of the coupler;
   laterally moving the coupler engagement member within a laterally extending slot of a body until at least a portion of the coupler is captured between the body and the coupler engagement member, the coupler engagement member extending perpendicularly from the slot; and fixing the position of the coupler engagement member with respect to the body, such that the body obstructs withdrawal of the coupler engagement member from the ball cavity of the coupler.

9. The method of claim 8 further comprising positioning a flange of the coupler into a flange retaining groove portion of the body.

10. The method of claim 8 further comprising positioning a coupler engagement portion of the body in contact with an external surface of the coupler.

11. The method of claim 8 further comprising fixing the position of an external coupler engagement member relative to the body.

12. The method of claim 11 further comprising positioning the external coupler engagement member in contact with an external surface of the coupler.

13. An assembly for restricting access to a coupler, the assembly comprising:
　a. a body configured for engagement with a coupler and defining a slot;
　b. an engagement member slidably mounted to the body within the slot, the body and the engagement member being configured to receive at least a portion of the coupler therebetween, wherein the engagement member defines a convex surface configured to engage a ball cavity of the coupler; and
　c. a locking mechanism movable between first, second, and third conditions;
　wherein when the locking mechanism is in the first condition, the engagement member is movable in two directions within the slot;
　further wherein when the locking mechanism is in the second condition, the engagement member is fixed with respect to the slot; and
　further wherein when the locking mechanism is in the third condition, the engagement member is restricted to movement in one direction with respect to the slot.

14. The assembly of claim 13 wherein the body includes a flange retention groove configured for selective engagement with a flange of the coupler.

15. The assembly of claim 13, wherein the engagement member comprises a rack and the locking mechanism comprises a rack engaging member, the rack engaging member being configured to be:
　disengaged from the rack when the locking mechanism is in the first condition;
　in rigid interlocking engagement with the rack when the locking mechanism is in the second condition; and
　in spring-biased engagement with the rack when the locking mechanism is in the third condition.

16. An assembly for restricting access to a coupler, the assembly comprising:
　a body configured for engagement with at least one surface of a coupler, the body including a coupler engagement portion;
　a coupler engagement member moveably coupled to the body and laterally movable with respect to the body, the coupler engagement member being configured for engagement with a ball cavity of the coupler; and
　a securing mechanism for laterally securing the coupler engagement member relative to the body in a coupler retaining position;
　wherein when the coupler engagement member is inserted in the ball cavity of the coupler and the coupler engagement member is secured in the coupler retaining position, the coupler engagement portion of the body prevents withdrawal of the coupler engagement member from the ball cavity;
　further wherein the coupler engagement portion of the body is movably coupled to a base portion of the body, the assembly further comprising a second securing mechanism for fixing the position of the coupler engagement portion relative to the base portion of the body.

17. The assembly of claim 16 wherein the second securing mechanism comprises:
　a. a fastener;
　b. at least one aperture defined by the body; and
　c. at least one passage defined by the external coupler engagement protrusion.

18. The assembly of claim 16 wherein the coupler engagement portion of the body is configured to engage an exterior surface of coupler when the assembly is secured to the coupler.

19. The assembly of claim 16 wherein the body includes a coupler flange retention groove configured for selective engagement with a flange of the coupler.

20. The assembly of claim 16 wherein the securing mechanism is coupled to the body and includes a locking member engageable with the coupler engagement member; wherein the locking member is operable between a first state and a second state.

21. The assembly of claim 20 wherein when the locking member is in the first state, the position of the coupler engagement member is fixed with respect to the body and when the locking member is in the second state, the coupler engagement member is moveable in at least two directions with respect to the body.

22. The assembly of claim 20 wherein the locking member is further operable to a third state; wherein when the locking member is in the third state, the coupler engagement member is limited to movement in one direction with respect to the body.

23. The assembly of claim 20 wherein the locking member comprises a lock cylinder.

24. An assembly for restricting access to either one of first and second couplers, the assembly comprising:
　a body comprising a first engaging portion;
　a movable member comprising a second engaging portion, the movable member being coupled to the body and movable with respect to the body between at least a coupler receiving position, a first retaining position, and a second retaining position; and
　a locking mechanism configured to lockingly secure the movable member in at least either one of the first retaining position and the second retaining position;
　wherein the assembly is configured to receive at least a receivable portion of either one of the first and second couplers when the movable member is in the coupler receiving position, the receivable portion of the first coupler having a different size than the receivable portion of the second coupler;
　further wherein the assembly is configured to prevent withdrawal of the receivable portion of the first coupler when the receivable portion of the first coupler is received in the assembly and the movable member is in the first retaining position; and
　further wherein the assembly is configured to prevent withdrawal of the receivable portion of the second coupler when the receivable portion of the second coupler is received in the assembly and the movable member is in the second retaining position.

25. The assembly of claim 24, wherein the second engaging portion is configured to engage an internal surface of either one of the first and second couplers.

26. The assembly of claim 24, wherein the movable member is slidable with respect to the locking mechanism, and the locking mechanism is configured to lockingly engage any one of a plurality of lockable portions of the movable member.

27. The assembly of claim 26, wherein the plurality of lockable portions comprise a plurality of teeth disposed on a slidable rack member.

28. The assembly of claim 24, wherein the movable member is laterally movable with respect to the body, wherein the body and movable member are configured to receive the receivable portion of either one of the first and second couplers laterally between the first and second engagement portions.

29. The assembly of claim 24, wherein the first and second engagement portions extend at least partially laterally to axially capture either one of the first and second couplers when the movable member is in the corresponding one of the first and second retaining positions.

30. The assembly of claim 24, wherein the body comprises a slot and the movable member is partially received in the slot for sliding movement between the coupler receiving position, the first retaining position, and the second retaining position.

* * * * *